United States Patent [19]

Brandt, Jr. et al.

[11] Patent Number: 5,678,678
[45] Date of Patent: Oct. 21, 1997

[54] APPARATUS FOR MEASURING THE PROFILE OF DOCUMENTS

[75] Inventors: Robert O. Brandt, Jr., Wilmington, N.C.; Elwood E. Barnes, Cochranville, Pa.; Ronald Bernardini, Downingtown, Pa.; Phillip René Reger, Newtown Square, Pa.

[73] Assignee: Mars Incorporated, McLean, Va.

[21] Appl. No.: 462,971

[22] Filed: Jun. 5, 1995

[51] Int. Cl.$^6$ .................... G07D 7/00; G01L 1/22
[52] U.S. Cl. .................... 194/206; 73/862.634
[58] Field of Search .................... 194/206; 271/262, 271/263; 33/501.03, 501.04; 73/862.634

[56] References Cited

U.S. PATENT DOCUMENTS

| | | |
|---|---|---|
| 2,177,051 | 10/1939 | Birmingham . |
| 2,194,325 | 3/1940 | Rhea . |
| 2,323,647 | 7/1943 | Colson . |
| 2,503,720 | 4/1950 | Gieseke . |
| 2,676,298 | 4/1954 | Frommer . |
| 2,726,541 | 12/1955 | Sims . |
| 2,891,667 | 6/1959 | Truver . |
| 2,932,089 | 4/1960 | Dexter, Jr. et al. . |
| 3,076,548 | 2/1963 | Branda et al. . |
| 3,244,971 | 4/1966 | Thompson . |
| 3,448,855 | 6/1969 | Soderstrom . |
| 3,462,680 | 8/1969 | Kahoun et al. . |
| 3,525,929 | 8/1970 | Mounce . |
| 3,553,668 | 1/1971 | Urmenyi . |
| 3,581,402 | 6/1971 | London et al. . |
| 3,688,886 | 9/1972 | Siby . |
| 3,826,487 | 7/1974 | Forster et al. ................... 271/263 |
| 3,918,704 | 11/1975 | Sugiyama et al. . |
| 4,068,385 | 1/1978 | Mitzel . |
| 4,121,716 | 10/1978 | Luperti et al. . |
| 4,271,699 | 6/1981 | Williamson . |
| 4,360,108 | 11/1982 | Logothetis . |
| 4,378,109 | 3/1983 | Takahashi et al. . |
| 4,449,399 | 5/1984 | Hain . |
| 4,462,587 | 7/1984 | Graef et al. . |
| 4,516,031 | 5/1985 | Kaule et al. . |
| 4,550,252 | 10/1985 | Tee . |
| 4,576,287 | 3/1986 | Bingham et al. . |
| 4,579,334 | 4/1986 | Durajczyk et al. . |
| 4,664,369 | 5/1987 | Graef et al. . |
| 4,700,368 | 10/1987 | Munn et al. . |
| 4,710,963 | 12/1987 | Chapman et al. . |
| 4,723,072 | 2/1988 | Naruse . |
| 4,729,556 | 3/1988 | Fujii et al. . |
| 4,749,087 | 6/1988 | Buttifant . |
| 4,818,871 | 4/1989 | Dupoy et al. . |
| 4,894,783 | 1/1990 | Milne . |
| 4,937,460 | 6/1990 | Duncan et al. . |
| 4,958,715 | 9/1990 | Suris . |
| 4,977,583 | 12/1990 | Gorgone . |
| 4,979,670 | 12/1990 | Konle . |
| 4,982,947 | 1/1991 | Milne . |
| 5,011,128 | 4/1991 | Tsuji . |
| 5,029,837 | 7/1991 | Uchiyama . |
| 5,165,290 | 11/1992 | Brandt ................... 73/862.622 |
| 5,474,289 | 12/1995 | Pilling ................... 271/262 X |

*Primary Examiner*—F. J. Bartuska
*Attorney, Agent, or Firm*—Fish & Richardson P.C.

[57] ABSTRACT

A profile sensor apparatus and method for measuring the contours and/or the thickness of a document or other thin sheet material is disclosed. In one embodiment, a planar beam assembly has a roller wheel attached to a first end and a mounting brace attached to a second end. The planar beam assembly includes at least one strain sensor and a flexible substrate, wherein the substrate may be coated with a visco-elastic polymer layer for damping any resonant vibrations which may occur during operation. A hard reference surface is located opposite the roller wheel. A mechanical preload biases the roller wheel to contact the reference surface with a predetermined amount of force to ensure correct operation. As a document passes between the reference surface and roller wheel, the roller wheel is displaced which in turn causes the planar beam assembly to flex. As the planar beam assembly deforms the strain sensor generates electrical signals which are proportional to the profile and/or the thickness of the document.

33 Claims, 5 Drawing Sheets

APPARATUS FOR MEASURING THE PROFILE OF DOCUMENTS

FIELD OF THE INVENTION

The invention pertains to a method and apparatus for measuring the surface contour profile or thickness of a document. In particular, a profile sensor assembly for use in banknote authentication devices and the like is disclosed.

BACKGROUND OF THE INVENTION

Techniques have existed for some time for measuring thickness differences in record carriers, information carriers or value carriers such as banknotes and the like. For example, U.S. Pat. No. 4,068,385 discloses an apparatus which comprises an elastic roller wheel mounted by means of a fixed bearing, a sensor and a fixedly mounted transducer. A gap corresponding to the smallest paper thickness resides between the roller wheel and the sensor. During operation, a banknote is transported through the gap, and the sensor contacts the paper to compress the elastic material to produce forces which generate voltages in the transducer proportional to the thickness of the paper. This device requires setting a gap size between the roller and sensor before operation that must be based upon a predetermined knowledge of banknote paper thickness characteristics. Further, a rather large elastic roller is required, so the device is not compact.

SUMMARY OF THE INVENTION

An object of the present invention is to provide a compact and sensitive profile sensor assembly to measure the surface contour profile of a document.

Another object of the invention is to provide an apparatus and technique for detecting embossing, watermarks, security threads, and the like on paper currency.

A further object of the invention is to provide an apparatus and technique for measuring the thickness of a test object.

Yet another object of the invention is to provide an apparatus and method for measuring the profile of thin sheet materials, including but not limited to, paper, paper money, checks, plastic money, plastic cards, business cards, embossed stationary, security documents and other paper or plastic thin sheet materials.

An embodiment of a profile sensor apparatus according to the invention includes a freely rotatable roller wheel mounted to the first end of a planar beam assembly. The second end of the planar beam assembly is pivotally connected to a mounting bracket, which may be attached to a document transport system. A reference surface is located opposite the roller wheel. A mechanical preload biases the roller wheel to contact the reference surface with a predetermined amount of force. In operation, a document under test moves between the reference surface and the roller wheel. As the document passes, the roller wheel is displaced according to the contours or profile of the document, which causes the planar beam assembly to flex in a direction normal to the reference surface. The planar beam assembly includes one or more strain gauges that generate signals when the planar beam deforms, and these signals are processed to glean data relating to surface characteristics and/or the thickness profile of the document.

Additional features which improve the performance of a device according to the invention include the use of damping materials in the planar beam assembly, and connecting the planar beam assembly to a mounting brace in a manner permitting side-to-side or lateral movement of the profile sensor assembly.

DETAILED DESCRIPTION

Figure 1A:
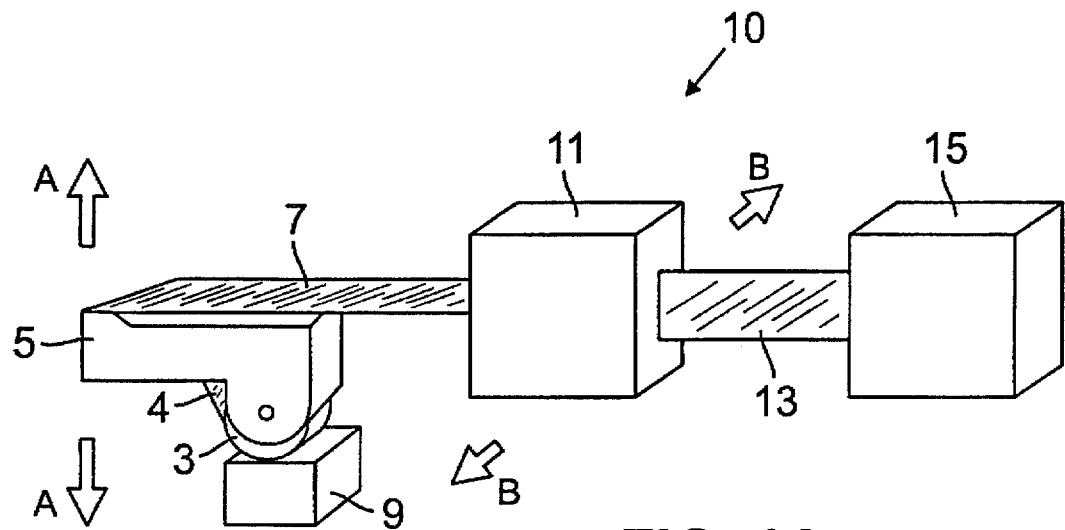
FIG. 1A is a perspective view of an embodiment of a profile sensor assembly according to the invention.

FIG. 1A illustrates an embodiment of a profile sensor assembly 10, not drawn to scale, according to the invention for accurately generating data relating to the surface contours or profile of a document. It should be understood that the term document used herein encompasses all currency-like materials, including but not limited to banknotes, paper currency, coupons, and checks. In addition, the term document used herein includes other thin-sheet materials such as paper, embossed paper, business cards, thin plastics, and thin composite materials.

Referring to FIG. 1A, a roller wheel 3 is attached to a first mounting brace 5 which is in turn attached to the first end of a flexible, but stiff planar beam assembly 7. The second end of the planar beam assembly 7 is attached to a second mounting brace 11. A lateral planar beam assembly 13 is attached at its first end to the second mounting brace 11, and is attached at its second end to a third mounting brace 15. The third mounting brace 15 may be used to connect the profile sensor assembly 10, for example, to the body of a document transport device such as a banknote transport mechanism 40 (shown in FIG. 4).

The planar beam assembly 7 applies pressure to the roller wheel 3 to contact a hardened reference surface 9 with a predetermined amount of force. The roller wheel 3 acts as a stylus and is free to rotate when a document passes between it and the reference surface 9. A wiping pad 4 or other cleaning device may be connected to the mounting brace 5 so that it contacts the surface of the roller wheel 3 to remove dirt and debris that may accumulate during use.

The planar beam assembly 7 deforms in the direction normal to the reference surface, shown as arrows "A", when a document passes between the roller wheel 3 and the reference surface 9. The planar beam assembly flexes in response to the surface contour profile, or thickness profile, of a test sample as it passes the roller wheel, which can act as a stylus to trace a particular path along the sample. A sensor 20 (shown in FIGS. 1C and 1D), which may comprise a semiconductor or metal foil bridge, is connected to the planar beam assembly 7 and translates the deformation forces into electrical signals for processing. It should be noted that, depending upon the stiffness or rigidity of the test sample, the information obtained from the electrical signals generated by the sensor will correspond to features from either one surface or both surfaces of the document. For example, the electrical signals generated when a relatively limp banknote passes between the reference surface and the roller wheel will reflect information from both the top and bottom surfaces. In contrast, substantially all of the electrical signals generated when a relatively stiff, thin plastic card (such as a credit card) is tested will reflect information from primarily the top surface, defined as the surface that contacts the roller wheel 3.

The planar beam assembly 7 is known as a flexure or weigh beam, and a weigh beam configuration as shown in FIG. 1A is commonly known as an "S-loaded" weigh beam. Such weigh beam configurations are ideal for converting an applied mechanical force into a linearly proportional electrical output, and S-loaded weigh beams yield greater force multiplications because bending of the beam causes an exaggerated loading signal to be generated. However, it should be understood that the benefits and advantages of the present invention can be achieved with equal efficacy when other beam loading arrangements, such as cantilevers, are employed.

The lateral planar beam assembly 13 of FIG. 1A flexes in a lateral direction to enable the roller wheel 3 to move laterally in a plane parallel to the reference surface 9, as indicated by the arrows "B". The profile sensor assembly 10 should be free to move laterally to ensure correct operation. In particular, such lateral movement enables the roller wheel 3 to track the side-to-side movement of a test subject that commonly occurs as it is transported past the roller wheel, and thus substantially prevents the occurrence of any side loading of the planar beam assembly 7. This is important because such side loading could be misinterpreted by the sensor on the planar beam assembly 7 as a vertical displacement of the roller wheel 3, resulting in erroneous data collected from the sample document. Further, in some applications, utilizing such a structure minimizes the need to precisely align the roller wheel 3 with the path of a document. Yet further, such a construction permits self-alignment of the roller wheel 3.

Figure 1B:
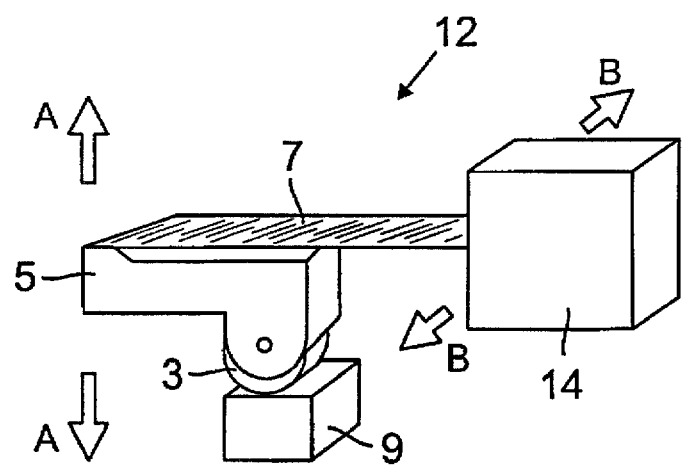
FIG. 1B is a perspective view of another embodiment of a profile sensor assembly according to the invention.

FIG. 1B is another embodiment of a profile sensor assembly 12, not drawn to scale, according to the present invention, wherein like components with respect to FIG. 1A have been numbered the same for ease of reference. The profile sensor assembly 12 has a roller wheel 3 attached to a mounting brace 5 which is in turn attached to the first end of a flexible but stiff planar beam assembly 7. The second end of the planar beam assembly 7 is pivotally connected to an assembly mounting brace 14 so that the roller wheel 3 can move in a lateral direction, indicated by the arrows "B", which is important for the reasons stated above. The mounting brace 14 may be attached to a document transport system (such as the banknote transport system 40 of FIG. 4). The planar beam assembly 7 presses the roller wheel 3 with a predetermined amount of force against the hardened reference surface 9. When a sample document passes between the roller wheel 3 and the reference surface 9, the planar beam assembly 7 flexes in a vertical direction, indicated by arrows "A". A sensor 20 (shown in FIGS. 1C and 1D) mounted on the planar beam generates electrical signals in response to the deformation of the planar beam, wherein the signals correspond to the surface contour profile or the thickness profile of the test sample.

Figure 1C:
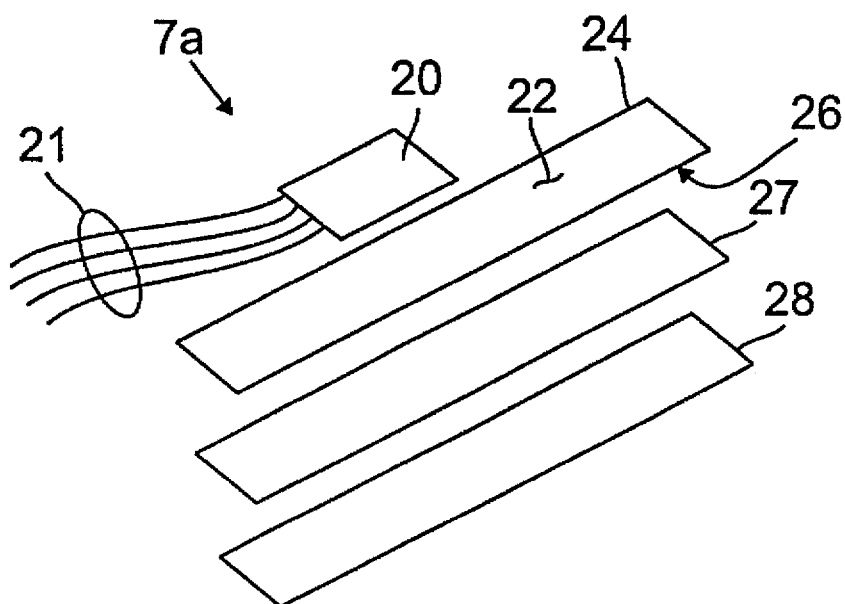
FIG. 1C is an exploded view of an embodiment of a planar beam assembly.
Figure 1D:
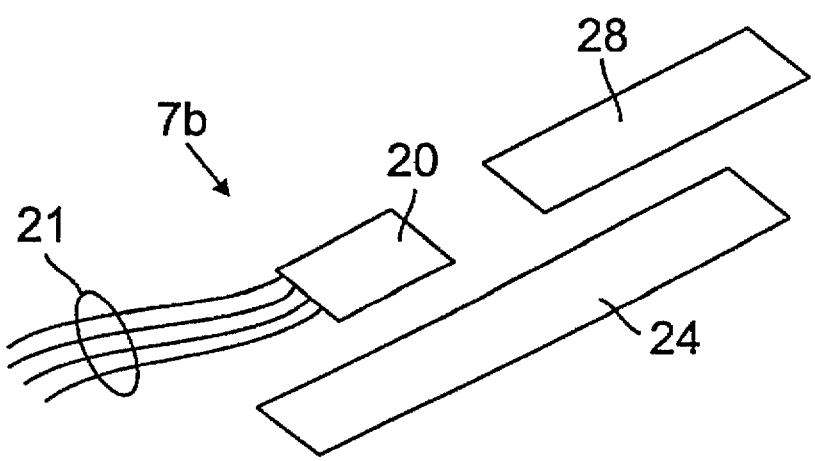
FIG. 1D is an exploded view of another embodiment of a planar beam assembly.

FIGS. 1C and 1D are exploded views of two embodiments of a planar beam assembly 7, labelled 7a and 7b, respectively, which are characterized by their ability to accurately measure an applied force of short duration. For ease of reference, like components have been numbered the same in FIGS. 1C and 1D.

In FIG. 1C, a sensor 20 comprises a strain gauge connected to a first surface 22 of a flat substrate 24. The substrate is preferably comprised of a material having a modulas of elasticity in a range of from $6 \times 10^6$ pounds per square inch to $32 \times 10^6$ pounds per square inch. A metal constraining layer 27 may be connected to the first surface 22 or to a second surface 26 of the substrate 24, and may cover part or all of the first surface 22 or the second surface 26. The metal constraining layer 27 is coated with a visco-elastic polymer layer 28, and in combination the layers act to mechanically damp the resonant vibrations of the substrate 24 that occur when the planar beam assembly 7 deforms as the roller wheel 3 responds to the passage of a test sample. Although FIG. 1C depicts only one constraining layer 27 and one layer of visco-elastic polymer 28, it should be understood that multiple metal constraining layers and visco-elastic polymer layers may be used depending on the sensitivity required for a particular measurement application.

FIG. 1D is an exploded view of another planar beam assembly embodiment 7b, wherein a sensor 20 comprises a strain gauge. The strain gauge and a visco-elastic polymer layer 28 are attached to a substrate 24. The substrate 24 is preferably comprised of a material having a modulas of elasticity in a range from $6 \times 10^6$ pounds per square inch to $32 \times 10^6$ pounds per square inch. As described above, the visco-elastic polymer layer 28 mechanically damps resonant vibrations of the substrate 24 induced by a test sample. The sensors 20 shown in both FIGS. 1C and 1D generate signals in response to the deformation of the planar beam assembly and these signals are carried from the assembly by leads 21.

The planar beam assemblies 7a and 7b of FIGS. 1C and 1D perform well in an environment of constant temperature. However, if a semiconductor strain gauge (or other sensor) with a large temperature coefficient is used, in practice it has been observed that the diode used to sense deformation of the substrate suffers from a large temperature-related output signal component. This output signal component must be compensated for in some fashion or else incorrect measurements will result. One solution to this problem is to mount a second diode on the substrate so that it is not subjected to any strain but is physically close to the first diode. Thus, the temperature experienced by the two diodes will be the same, but the signal from the second diode is used to provide temperature information only. This temperature signal can then be used in a bridge arrangement or other circuit to compensate for the additional temperature signal component of the first diode. One skilled in the art knows how to use the signals generated by the second diode to normalize the data from the first diode to remove the additive signal component caused by temperature variations.

Strain gauge and beam member units can be purchased preassembled and off the shelf from a supplier such as Omega Engineering, Inc. (See, for example, part numbers LCL 454G and LCL 113G). Alternately, custom made units may be ordered from a supplier as required for specific applications. For example, a visco-elastic element and strain gauge can be fabricated as a subassembly and then added as an integral unit to the substrate or assembly arm of the profile sensor during manufacture. Alternatively, such a subassembly could be incorporated into the fabrication of the profile sensor and bonded or attached to the assembly arm or planar beam.

Figure 2A:
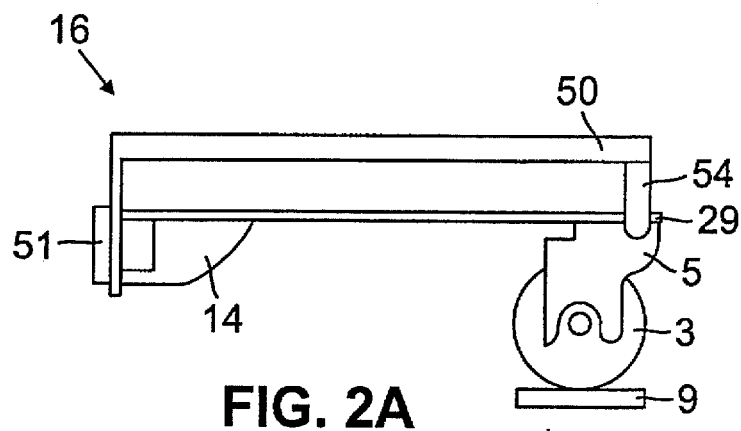
FIG. 2A is a side view of a compact embodiment of a profile sensor according to the invention.
Figure 2B:
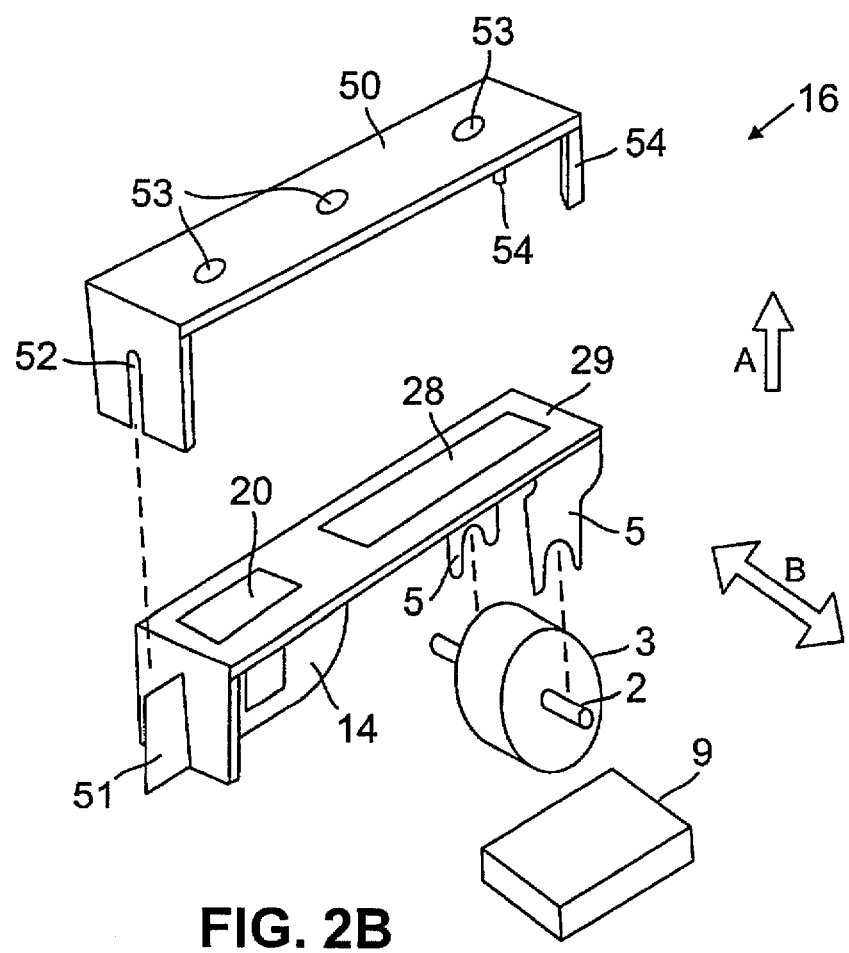
FIG. 2B is an exploded view illustrating details of the profile sensor of FIG. 2A.

FIG. 2A is a side view of an embodiment of a compact profile sensor 16, not drawn to scale, according to the invention, wherein like components with respect to FIGS. 1A and 1B have been numbered the same. The compact profile sensor assembly 16 contains the features discussed above, however, the components have been integrated and refined to produce the compact device as shown. FIG. 2B is an exploded view of the compact profile sensor assembly 16 of FIG. 2A.

Referring to FIG. 2B, the compact profile sensor 16 comprises an assembly arm 29 made from a material such as steel or hardened beryllium copper which has integral wheel support braces 5 for engaging the axle 2 of the roller wheel 3. The assembly arm 29 also contains an integral mounting brace 14 having a mounting tab 51 for attachment to a mounting bracket 50. Part of the top surface of the assembly arm 29 is coated with a visco-elastic polymer 28, and a strain gauge sensor 20 is attached as shown to sense flexing during operation. The strain gauge sensor 20 may be fabricated from diodes, or comprise a more conventional metal foil sensor or other sensor device. The mounting bracket 50 attaches to a document transport device by means of mounting holes 53. The mounting tab 51 of the assembly arm 29 fits through the slot 52 of the mounting bracket 50 in a manner that permits the assembly arm 29 to pivot in a plane parallel to the surface of the reference surface 9, in the direction of the arrow "B". The slot 52 of the mounting bracket 50 also provides a predetermined amount of force to the tab 51 to bias the roller wheel 3 against the reference surface 9. Although a particular mounting tab and slot assembly has been shown and described, it should be understood that other methods of pivotally attaching the assembly arm 29 to a mounting bracket 50 are contemplated and are within the technical competence of those skilled in the art.

The compact profile sensor assembly 16 of FIGS. 2A and 2B contains design features which restrict the roller wheel 3 from deflecting past operational limits. In particular, the mounting bracket 50 is designed to provide a mechanical stop to prevent excessive deflection of the assembly arm 29 in the vertical direction, in the direction shown by the arrow A. The mounting bracket 50 in effect limits the vertical deflection range because the forward end of the assembly arm 29 located above the roller wheel 3 will physically contact the mounting bracket 50 if displaced too much. Further, the horizontal or lateral movement of the roller wheel 3 is limited by bracket ears 54. In particular, the sides of the assembly arm 29 or the support braces 5 will contact the bracket ears 54 if the roller wheel 3 is displaced too far in the horizontal plane, to thus limit the pivoting movement of the assembly arm in the lateral direction depicted by the arrows B. These mechanical stop features prevent damage to the assembly arm 29, especially in the case of insertion of a foreign object by a vandal. The mechanical stop action provided by the mounting bracket 50 does not interfere with normal motion of the assembly arm 29, but rather merely limits excessive motion. Of course, one skilled in the art could design an alternative mounting bracket or other mechanical stop to perform the same preventive function. Further, for some applications the bracket ears 54 can be set at wider limits or eliminated altogether to permit a wider range of motion in the lateral direction.

A visco-elastic polymer suitable for use on the arm assembly 29 of FIGS. 2A and 2B, or for use with the planar beam assemblies 7a and 7b of FIGS. 1C and 1D, is manufactured by the 3M Company and marketed under the name "Scotchdamp®". The polymer may be self-adhesive, require "hot melt" application, or otherwise be attached to all or part of at least one side of a substrate layer 24, or a metal constraining layer 27, or an assembly arm 29.

Figure 3:
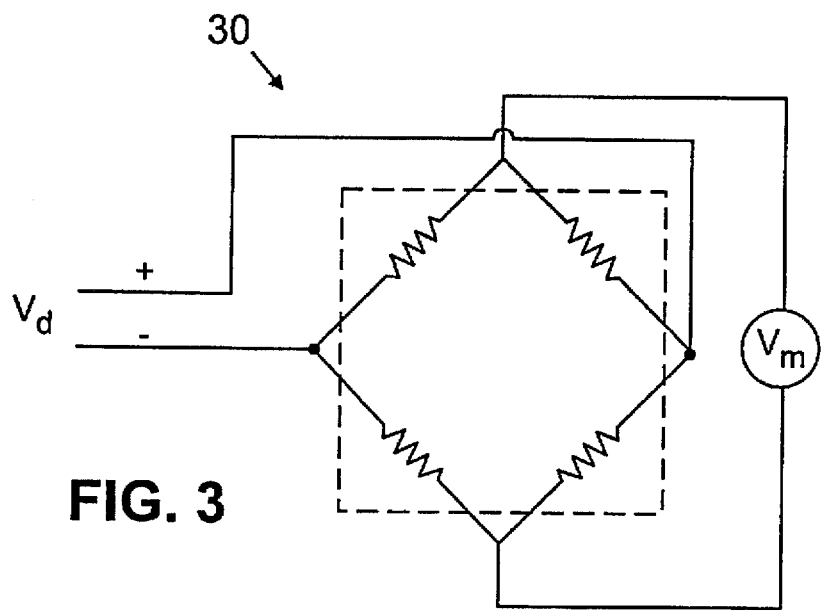
FIG. 3 illustrates a typical Wheatstone bridge circuit.

Strain gauges are composed of a resistive material that changes resistivity when placed under tension or compression. A strain gauge 20 for use with the present invention may be a semiconductor, metal foil or other device and may form one or more arms of a bridge circuit. If the strain gauge has four arms then a Wheatstone bridge configuration 30, shown in FIG. 3 and familiar to those of skill in the art, can be used to obtain an output signal Vm which is a measure of the amount of flexure of the planar beam assembly 7. If a Wheatstone bridge circuit is used, then four output lines 21 (see FIGS. 1C and 1D) are required. Two of the lines carry an input signal $V_d$ to the bridge circuit, while the other two lines carry an output signal $V_m$ that is generated by the deformation of the substrate 24 (or assembly arm 29 of FIG. 2A) as a sample document displaces the roller wheel 3. The electrical signals generated in this manner are proportional to the contours or profile of the document. It should be understood, however, that the benefits and advantages of the present invention can be obtained with equal efficacy when other circuit arrangements, such as those having one or two arms, are employed.

Referring again to FIGS. 1A, 1B, 2A and 2B, it is important to note that a preset force or loading of the planar beam assembly 7 or assembly arm 29 is required to bias the roller wheel 3 against the reference surface 9 at all times. This preset force is called a preload. An appropriate preload value must be chosen with care because the preload exerts a significant influence upon the performance of the profile sensor assembly, particularly when a sample document contains folds or wrinkles. If the preload is too light, then folds or wrinkles in the document will not be smoothed or straightened by the roller wheel, leading to erroneous document profile data. Conversely, if the preload is too heavy, then embossing, engraving and possibly even the paper fibers of the document itself will be distorted, modified or damaged by the roller wheel, again resulting in erroneous document profile data.

It has been found that a roller wheel having a 1 centimeter diameter and a footprint or rim width of 3 millimeters performs well with respect to paper currency when the preload is 0.5 to 5.0 newton. Translated to units of force per unit wheel width, a preload of approximately 1.5 newton/centimeters to 15 newton/centimeters is recommended. To obtain the required preload constant, the lateral mounting brace 15 of FIG. 1A, or the mounting brace 14 of FIG. 1B, or the mounting bracket 50 of FIG. 2B, is adjusted with respect to its connection to a document transport system. In particular, if the reference surface 9 is stationary, adjustment is accomplished by moving the connection of the mounting brace or bracket either up or down in a vertical plane (depicted by arrows "A" in FIGS. 1A and 1B). Alternately, it may be possible to adjust the alignment of the reference surface 9 with respect to the roller wheel 3 and lateral beam assembly 7, or assembly arm 29, to obtain the necessary preload value.

Since the roller wheel 3 must be loaded at all times, friction and wear of the reference surface 9 during operation would be unacceptably high unless it is made of a very hard and smooth material. Thus, the reference surface 9 is preferably made of polished tungsten carbide or a hardened surface material such as a diamond film on a suitable substrate. In addition, the roller wheel must be composed of a material of sufficient hardness or elasticity to preclude any loss of resolution due to roller wheel material deformation. It has been found that a wheel comprised of material having a modulas of elasticity in a range from $6 \times 10^6$ pounds per square inch to $32 \times 10^6$ pounds per square inch performs well.

Profile sensor assemblies 10, 12 and 16 may utilize a roller wheel 3 having a diameter and a footprint of such size to permit the use of an appropriate preload to allow the stiffness or modulas of the sample document to be measured. Thus, the use of many different roller wheel configurations having different diameters and/or different footprints are contemplated. For example, the roller wheel cross-section may be rectangular, oval, egg shaped, diamond shaped, or may otherwise contain a thin section or rim for contacting sample documents. In addition, it is contemplated that two or more profile sensor assemblies could be utilized together in the same document transport system to collect data from the same region or different regions of a test sample, and/or to measure the ability of such a document to respond to different preload forces. In such a system, the roller wheels in each of the profile sensor assemblies may be of different sizes and shapes, or may be identical. The measurements obtained therefrom may then be processed to authenticate or validate the test sample.

It should be noted that the measurement signals obtained from the profile sensor assemblies 10, 12 and 16 can be mathematically and/or statistically processed to identify a test sample as belonging to a particular type according to predetermined values taken from two or more different populations of test samples. For example, the signals could first be normalized, then processed to take the average and/or the standard deviation, and compared to predefined histograms or test limits to identify the test sample. Alternately, techniques involving the average, standard deviation, taking limits, histograms, normalization and other mathematical and statistical techniques could be used to separate two or more different populations of test samples. Further, two or more populations of samples can be separated in a database by partitioning certain characterizations of the measurements, and such derived parameters permit different family members to be identified when presented singly at a later time. Thus, for example, in a banknote validator of a vending machine, the signals gathered from a sample document can be processed and then compared to a database containing derived parameters for the family of U.S. banknotes. If a match occurs, for example, between the measured data and the data for an authentic ten dollar banknote, then the sample document is accepted and a product or service is vended.

It should be noted that, to obtain a high frequency response from a profile sensor assembly according to the invention, the mass of the planar beam assembly 7, or assembly arm 29, and the roller wheel 3 should be kept low. The diameter and width of the roller wheel should be kept reasonably small as well. Further, damping materials should be used, as discussed above, to allow higher frequency components of the output signal to be extracted while minimizing electronic circuit overshoot problems.

Figure 4:
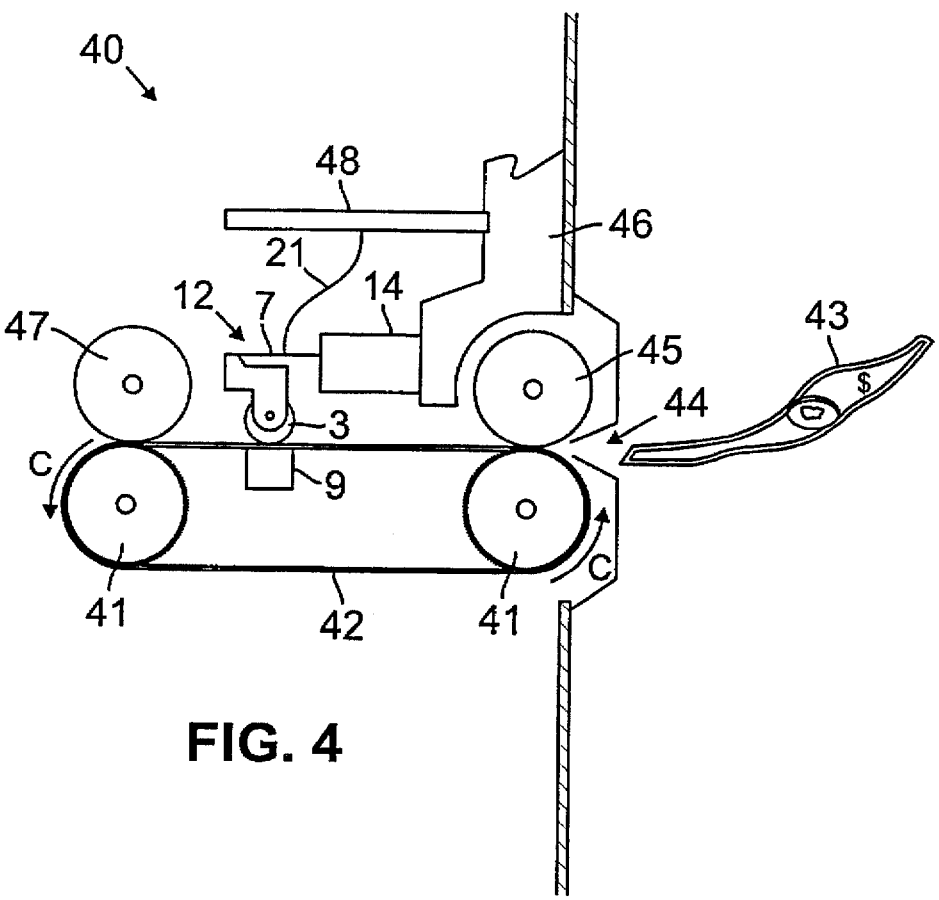
FIG. 4 is a simplified, cutaway side view of a banknote transport mechanism and an embodiment of a profile sensor assembly according to the invention.

FIG. 4 is a simplified, cutaway side view of a typical banknote transport mechanism 40 that may be used, for example, in a vending machine. The mounting brace 14 of a profile sensor assembly 12 of FIG. 1B is shown attached to a wall 46 of the transport mechanism 40. Two pairs of drive wheels 41 (only one wheel of each pair is shown) powered by a motor (not shown) turn in a counterclockwise direction indicated by arrows "C" to cause a belt 42 to move when a banknote 43 is inserted into a banknote entryway 44.

Details of the operation of such a banknote transport system are beyond the scope of the present application and thus are not discussed further herein. It is sufficient to understand that a banknote 43 is gripped between the belt 42 and the front pulley wheel 45, transported between the roller wheel 3 and the reference surface 9, and finally pulled between the rear pulley wheel 47 and the belt 42 to exit the transport system 40. As the banknote 43 passes between the roller wheel 3 and the reference surface 9 on its journey, the roller wheel 3 is displaced in a vertical plane and the planar beam assembly 7 will be urged upwards against the force of its mechanical preload. The planar beam assembly 7 generates signals that are transmitted through one or more lines 21 to a circuit board 48. The circuit board 48 provides power to the strain gauge 20 (see FIGS. 1C or 1D), and preferably contains electronic circuitry utilizing autozero processing techniques. A circuit using autozero processing will electronically recognize a zero displacement condition of the profile sensor assembly and a non-zero displacement condition indicating that a document is moving between the roller wheel 3 and the reference surface 9. In this manner, data regarding the contours of the banknote is gathered.

Figure 5:
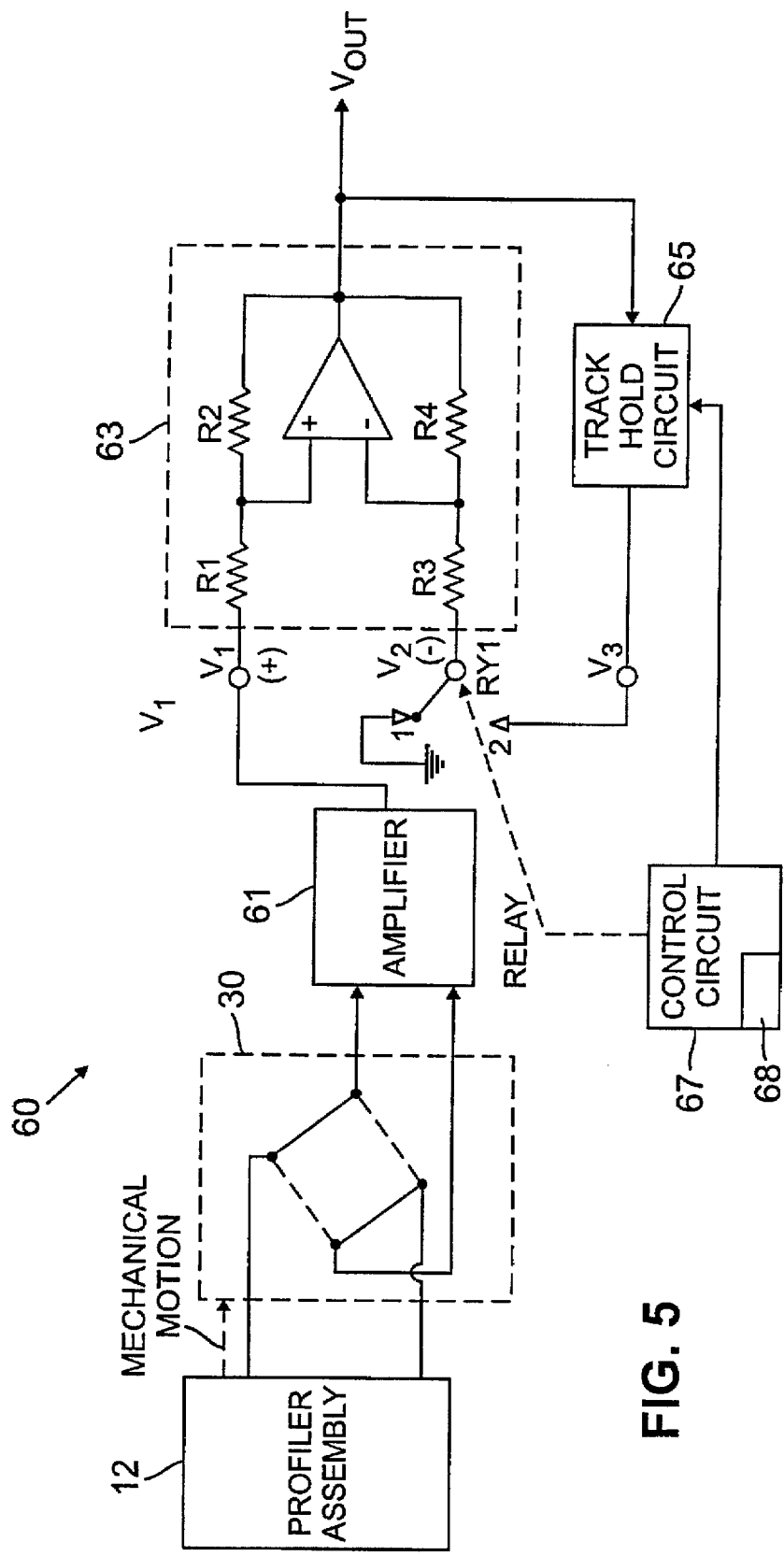
FIG. 5 is a simplified schematic block diagram illustrating the electrical connection of a profile sensor assembly to an embodiment of signal processing circuitry capable of performing an auto-zero function.

FIG. 5 is a simplified schematic block diagram of the profile sensor assembly 12 connected to an embodiment of processing circuitry 60 that performs an auto-zero on the output signal of the profile sensor. The profile sensor 12 provides mechanical motion as a document passes to excite the bridge circuit 30 to produce an output signal. This signal is amplified by an amplifier 61 and is passed into the non-inverting input of a differential amplifier circuit 63. Resistors R1, R2, R3 and R4 are identical in value. The differential amplifier circuit 63 has a gain of +1 (non-inverting) at $V_1$ and a gain of −1 (inverting input) at $V_2$. The output of the differential amplifier 63 is the auto-zero compensated output which is fed as a signal $V_{out}$ to subsequent processing circuitry. Alternately, the signal $V_{out}$ may be passed through an analog-to-digital converter and then stored before further processing. A track hold circuit 65 utilizes the output $V_{out}$ of the circuit 63 as an input. A relay RY1 presents to the inverting input $V_2$ of the differential amplifier circuit 63 a ground signal when the relay is de-energized and the contacts are connected to position 1, as shown. However, when RY1 is activated and the contacts are in position 2 the output of a track hold circuit 65 is presented to $V_2$. This selection is determined by control circuit 67 which may include a non-volatile memory 68. It should be understood that the control circuit 67 may include a microprocessor and associated RAM and ROM which may not only process the signals generated by the profile assembly 12, but can also compare the processed signals to predetermined values in memory to validate and/or distinguish a test sample as belonging to one of any number of document types.

Just prior to presentation of a sample document, the profile sensor 12 is resting with the wheel 3 against the reference surface 9 (see, for example, FIG. 2A). Any error because of imperfect temperature compensation, amplifier offset error, or the like will manifest itself as a non-zero signal at the output $V_{out}$ of the differential amplifier 63. Before a sample document is inserted for sensing by the profile sensor assembly 12, the common contact of de-energized relay RY1 is in position 1 as shown in FIG. 5 so that the inverting input of differential amplifier 63 is at ground potential.

If another sensor is used to detect the presence of the test sample prior to the document arriving at the roller wheel 3, then the output $V_3$ of the track hold circuit 65 will reflect the output of differential amplifier 63 or a rest error signal. The control circuit 67 will isolate the track hold circuit 65 so that the output $V_3$ continues to present this rest error signal. The track hold circuit 65 will ignore any new input $V_{out}$ and will hold the error signal as $V_3$. The relay RY1 is then energized and the common contact will switch to position 2 so that the inverting input $V_2$ of differential amplifier 63 is presented with the output of the track hold circuit 65 (which is the error signal $V_3$) so that compensation will occur. For example, if the rest output signal of differential amplifier 63 was one volt, since the inverting input $V_2$ of the amplifier circuit 63 is held at ground by the contacts of the de-energized relay RY1, the signal $V_1$ presented at the non-inverting input $V_1$ of 63 must be one volt since differential amplifier 63 has a gain of 1 at this input. This one volt signal is presented to inverting input $V_2$ by the track hold circuit 65 and is inverted. It exactly, to first order, cancels out the error of the system ($V_1-V_2=0$), and the output $V_{out}$ is zero. Thus, any subsequent signal received from the profiler assembly as a test sample is transported between the roller wheel and reference surface will have the errors of the system subtracted from it and will reflect true signal levels.

The process of holding a rest error signal in the track hold circuit 65 can be realized on a continuous basis to capture or trap the system error, or can be updated on an ongoing basis. When the control circuit 67 recognizes that a document sample is in place, the track hold circuit 65 is not updated and the last sample of the error is used to compensate for system error. Thus, it is not necessary to use another sensor to detect the presence of the sample document before it engages the profile sensor assembly.

One skilled in the art will recognize that alternate circuit configurations or techniques can be utilized to accomplish an auto-zero function. For example, the output of the profile sensor could be converted from an analog signal to a digital signal, and then any one of a number of software techniques could be used to compensate for the system error component of the digital signal.

Data generated by a profile sensor assembly according to the invention may provide accurate indications of document thickness, surface characteristics, and wear, and further can indicate if foreign objects such as tape are attached to the document. Additionally, multiple banknotes which are one atop the other can be detected because thickness information is supplied by the invention. Further, the data may be processed to obtain a measure of the bulk modulus of the document. In addition, watermarks, and in some cases, security threads and information indicative of the type of paper fiber used in a document may be sensed. Furthermore, data can be generated relating to characteristics of the printing process itself, such as embossing, intaglio, and inking process traits. This data can be used, for example, to determine if two or more sample banknotes are present, to authenticate and denominate a sample banknote, and/or to determine document composition.

It should be understood that a profile sensor assembly as shown in the drawings could be inverted for use in document transport systems and the like if necessary. One skilled in the art would know how to adjust the preload forces and how to interpret the output signals of such a configuration. Further, although a roller wheel has been described for contacting a sample document, other suitable configurations are contemplated. For example, a ballbearing arrangement, a smooth surface, a stylus, or a belt arrangement could be connected to the planar beam and biased towards a reference surface for measuring the contours of a sample document.

Although the profile sensor assemblies 10, 12 and 16 have been described in the context of banknote or currency validation, it will be apparent to one skilled in the art that a profile sensor according to the invention could be used to generate data to identify other thin sheet materials, such as plastic cards, checks, business cards, embossed paper documents and the like. Further, it will be clear to those skilled in the art that variations or modifications can be made to the described apparatus and method without departing from the spirit and scope of the invention, and such modifications or variations are considered to be within the scope of the claims.

We claim:

1. An apparatus for measuring the contours and/or thickness of a thin sheet material, comprising:
   a planar beam assembly having a first end and a second end, wherein electrical signals are generated as the planar beam assembly flexes in response to a test subject;
   a freely rotatable wheel mounted to the first end of the planar beam assembly;
   a hard, flat reference surface located opposite the wheel; and
   a mounting brace attached to the second end of the planar beam assembly, wherein the mounting brace and the planar beam assembly apply a preload to bias the rotatable wheel to contact the reference surface with a predetermined amount of force, and wherein the planar beam assembly flexes in a direction normal to the reference surface when the subject passes between the wheel and the reference surface, and wherein the second end of the planar beam assembly is pivotally attached to the mounting brace such that the apparatus can move in a lateral direction that is parallel to the plane of the reference surface.

2. The apparatus of claim 1, wherein the planar beam assembly comprises:
   a substrate layer; and
   at least one strain measuring device attached to the substrate layer which generates output signals when the substrate layer deforms.

3. The apparatus of claim 2, further comprising:
   at least one metal constraining layer attached to the substrate layer.

4. The apparatus of claim 2, wherein the substrate layer is coated with a visco-elastic polymer.

5. The apparatus of claim 3, wherein the metal constraining layer is coated with a visco-elastic polymer.

6. The apparatus of claim 1, further comprising:
   electronic circuitry to provide power and to process the output signals.

7. The apparatus of claim 6, wherein the electronic circuitry provides compensation for zero reference, zero drift, and temperature variations.

8. The apparatus of claim 6, wherein the electronic circuitry provides signal amplification.

9. The apparatus of claim 1, further comprising:
   processing and control circuitry that utilizes signal processing techniques to identify a test sample.

10. The apparatus of claim 9, further comprising:
    a non-volatile memory.

11. The apparatus of claim 1, wherein the reference surface is made of polished tungsten steel.

12. The apparatus of claim 1, wherein the reference surface is made of polished tungsten carbide.

13. The apparatus of claim 1, further comprising:
    a mechanical stop to prevent excessive flexing of the planar beam assembly in the direction normal to the reference surface.

14. The apparatus of claim 1, further comprising:

a mechanical stop to prevent excessive movement of the planar beam assembly in the lateral direction.

15. The apparatus of claim 1, further comprising:

a sensor for generating signals as the planar beam assembly flexes.

16. The apparatus of claim 15, further comprising:

a second sensor for generating signals in response to temperature variations.

17. An apparatus for measuring the contours and/or thickness of a thin sheet material, comprising:

a planar beam assembly having a first end and a second end, wherein electrical signals are generated as the planar beam assembly flexes in response to a test subject;

a freely rotatable wheel mounted to the first end of the planar beam assembly;

a hard, flat reference surface located opposite the wheel; and a mounting brace attached to the second end of the planar beam assembly, wherein the mounting brace and the planar beam assembly apply a preload to bias the rotatable wheel to contact the reference surface with a predetermined amount of force, and wherein the planar beam assembly flexes in a direction normal to the reference surface when the subject passes between the wheel and the reference surface; and a cleaning device attached to the planar beam assembly to remove dirt and debris from the surface of the rotatable wheel.

18. An apparatus for measuring the contours and/or the thickness of a thin sheet material, comprising:

a planar beam assembly having a first end and a second end, wherein electrical signals are generated as the planar beam assembly flexes in response to a test subject;

a freely rotatable wheel connected to the first end of the planar beam assembly;

a reference surface located opposite the wheel;

a first brace connected to the second end of the planar beam assembly;

a lateral beam assembly having a first end connected to the first brace and having a second end, wherein the lateral beam assembly can flex in a plane parallel to the plane of a test subject to permit the rotatable wheel to move in a lateral direction parallel to the plane of the reference surface; and a mounting brace connected to the second end of the lateral beam assembly;

wherein a preload is applied to bias the rotatable wheel to contact the reference surface with a preset amount of force, and wherein the planar beam assembly flexes in a direction normal to the reference surface when a test subject passes between the wheel and the reference surface.

19. The apparatus of claim 18, wherein the planar beam assembly comprises:

a substrate layer; and at least one strain measuring device attached to the substrate layer which generates output signals when the substrate layer deforms.

20. The apparatus of claim 19, further comprising:

a metal constraining layer attached to the substrate layer.

21. The apparatus of claim 19, wherein the substrate layer is coated with a visco-elastic polymer.

22. The apparatus of claim 18, further comprising:

electronic circuitry to provide power and to process the output signals.

23. The apparatus of claim 22, wherein the electronic circuitry provides compensation for zero reference, zero drift, and temperature variations.

24. The apparatus of claim 18, further comprising:

processing and control circuitry which utilizes signal processing techniques to identify a test sample.

25. The apparatus of claim 24, further comprising:

a non-volatile memory.

26. The apparatus of claim 25, wherein the memory stores predetermined values corresponding to at least one population of documents.

27. The apparatus of claim 18, wherein the reference surface is made of polished tungsten steel.

28. The apparatus of claim 18, wherein the reference surface is made of polished tungsten carbide.

29. The apparatus of claim 18, further comprising:

a cleaning device attached to the planar beam assembly to remove dirt and debris from the surface of the rotatable wheel.

30. The apparatus of claim 18, further comprising:

a mechanical stop to prevent excessive flexing of the planar beam assembly in the direction normal to the reference surface.

31. The apparatus of claim 18, further comprising:

a mechanical stop to prevent excessive movement of the lateral beam assembly.

32. The apparatus of claim 18, further comprising:

a sensor for generating signals as the planar beam assembly flexes.

33. The apparatus of claim 32, further comprising:

a second sensor for generating signals in response to temperature variations.

* * * * *